US006987567B2

(12) United States Patent
Takahashi et al.

(10) Patent No.: US 6,987,567 B2
(45) Date of Patent: Jan. 17, 2006

(54) COLOR EVALUATION APPARATUS AND METHOD

(75) Inventors: Kosei Takahashi, Kanagawa (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 10/434,162

(22) Filed: May 9, 2003

(65) Prior Publication Data

US 2003/0210395 A1 Nov. 13, 2003

(30) Foreign Application Priority Data

May 10, 2002 (JP) ............................ 2002-136140

(51) Int. Cl.
*G01N 21/25* (2006.01)

(52) U.S. Cl. ...................................................... 356/405

(58) Field of Classification Search ................ 356/405; 382/167

See application file for complete search history.

(56) References Cited

U.S. PATENT DOCUMENTS

| | | | | |
|---|---|---|---|---|
| 5,742,296 | A | 4/1998 | Yamada et al. | 345/431 |
| 5,915,076 | A | 6/1999 | Sugita | 395/109 |
| 5,929,906 | A | 7/1999 | Arai et al. | 348/223 |
| 5,933,252 | A | 8/1999 | Emori et al. | 358/500 |
| 6,061,153 | A | 5/2000 | Sugita | 358/518 |
| 6,072,464 | A | 6/2000 | Ozeki | 345/154 |
| 6,343,137 | B1 | 1/2002 | Kimura et al. | 382/100 |
| 6,504,960 | B2 | 1/2003 | Takahashi | 382/305 |
| 2002/0012461 | A1 * | 1/2002 | MacKinnon et al. | 382/164 |
| 2002/0044292 | A1 | 4/2002 | Yamada et al. | |
| 2002/0071605 | A1 | 6/2002 | Iida et al. | |
| 2002/0113880 | A1 * | 8/2002 | Iida et al. | 348/222 |
| 2003/0020727 | A1 * | 1/2003 | Newman | 345/604 |
| 2003/0048464 | A1 | 3/2003 | Yamada et al. | |
| 2003/0142222 | A1 * | 7/2003 | Hordley | 348/223.1 |
| 2005/0083346 | A1 | 4/2005 | Takahashi et al. | 345/600 |

FOREIGN PATENT DOCUMENTS

| | | | |
|---|---|---|---|
| EP | 0 763 929 | A1 | 3/1997 |
| EP | 1 054 560 | A2 | 5/2000 |
| EP | 1 054 560 | A3 | 5/2000 |
| EP | 1 096 787 | A2 | 5/2001 |
| JP | 2-241271 | A | 9/1990 |
| JP | 5-296836 | A | 11/1993 |
| JP | 06-189122 | A | 7/1994 |

(Continued)

*Primary Examiner*—Gregory J. Toatley, Jr.
*Assistant Examiner*—Kara Geisel
(74) *Attorney, Agent, or Firm*—Fitzpatrick, Cella, Harper & Scinto

(57) ABSTRACT

A spectral distribution error evaluation apparatus is used to evaluate precision of color matching between evaluation and target colors. A first weighting function generator generates a first weighting function on the basis of color matching functions, wavelength characteristics which are independent of a light source of the target color, and visual characteristics which depend on wavelengths. A second weighting function generator generates a second weighting function on the basis of light source information of selected light sources. A difference calculator calculates error values between the evaluation and target colors for respective frequencies. An evaluation value calculator applies the first and second weighting functions to the error values, and calculates the sum total of the error values as an evaluation value. In this way, a precision evaluation value which has high correlation with actual color appearance and is used to improve the color matching precision can be calculated independently of a change in condition such as a light source or the like.

19 Claims, 14 Drawing Sheets

FOREIGN PATENT DOCUMENTS

| | | | |
|---|---|---|---|
| JP | 6-332313 | A | 12/1994 |
| JP | 08-94440 | A | 4/1996 |
| JP | 08-107508 | A | 4/1996 |
| JP | 09-33347 | A | 2/1997 |
| JP | 9-120185 | A | 5/1997 |
| JP | 9-163382 | A | 6/1997 |
| JP | 10-262157 | | 9/1998 |
| JP | 2001-8047 | A | 1/2001 |
| JP | 2001-053976 | A | 2/2001 |
| JP | 2001-186364 | A | 7/2001 |
| JP | 2002-290756 | A | 10/2002 |
| JP | 2002-365133 | A | 12/2002 |
| JP | 2003-169224 | A | 6/2003 |
| WO | WO 03/095202 | | 11/2003 |

* cited by examiner

COLOR EVALUATION APPARATUS AND METHOD

FIELD OF THE INVENTION

The present invention relates to a color matching technique and, more particularly, to a technique for evaluating an error between an original color and reproduction color upon spectrally reproducing a color.

BACKGROUND OF THE INVENTION

Upon reproducing colors by a display, printer, and the like, color matching is normally made by a method of matching the tristimulus values of an original with those of an output on the basis of the trichromatic theory. A human being converts the spectral reflectance of an object as a continuous function in a visible wavelength range (about 380 to 780 nm) into responses (to be referred to as tristimulus values hereinafter) of three different cells called cones, which are distributed on the retina, and perceives colors of the object on the basis of the tristimulus values. As typical calorimetric systems used to quantify the tristimulus values, an XYZ calorimetric system and CIELAB calorimetric system are known. The XYZ calorimetric system is defined by:

$$X = k\int_{380nm}^{780nm} S(\lambda)R(\lambda)\bar{x}(\lambda)d\lambda \tag{2}$$

$$Y = k\int_{380nm}^{780nm} S(\lambda)R(\lambda)\bar{y}(\lambda)d\lambda \tag{3}$$

$$Z = k\int_{380nm}^{780nm} S(\lambda)R(\lambda)\bar{z}(\lambda)d\lambda \tag{4}$$

$$\text{for } k = \frac{100}{\int_{380nm}^{780nm} S(\lambda)y(\lambda)}$$

$S(\lambda)$: spectral distribution of illumination $R(\lambda)$: spectral reflectance of object $\bar{x}(\lambda)$, $\bar{y}(\lambda)$, $\bar{z}(\lambda)$: color matching functions The CIELAB calorimetric system is defined by:

$$L^* = 116f\left(\frac{Y}{Y_n}\right) - 16 \tag{5}$$

$$a^* = 500\left\{f\left(\frac{X}{X_n}\right) - f\left(\frac{Y}{Y_n}\right)\right\} \tag{6}$$

$$b^* = 200\left\{f\left(\frac{Y}{Y_n}\right) - f\left(\frac{Z}{Z_n}\right)\right\} \tag{7}$$

$$f\left(\frac{X}{X_n}\right) = \begin{cases} \left(\frac{X}{X_n}\right)^{\frac{1}{3}}, & \frac{X}{X_n} > 0.008856 \\ 7.787\left(\frac{X}{X_n}\right) + \frac{16}{116}, & \frac{X}{X_n} \le 0.008856 \end{cases}$$

$f(Y/Y_n)$ and $f(Z/Z_n)$ are similarly calculated. Also, as a typical method of quantifying the difference between colors of two objects, color difference ΔE specified by the CIE (International Commission on Illumination) is known, and is given by:

$$\Delta E = \sqrt{(L_1^* - L_2^*)^2 + (a_1^* - a_2^*)^2 + (b_1^* - b_2^*)^2} \tag{1}$$

Upon color matching among an image input device such as a scanner, digital camera, or the like, an image display device such as a monitor or the like, and an image output device such as a printer or the like, color correction parameters and the like are optimized using equation (1) above so as to minimize color difference ΔE between the object and target colors.

On the other hand, when a human being perceives the colors of an object, the illumination condition largely influences such perception. In order to precisely reproduce colors under various illumination light sources, spectral reflectance characteristics must be matched (such process will be referred to as spectral color reproduction) in place of tristimulus values, and a color correction method that minimizes errors between spectral reflectance characteristics is known.

For example, Japanese Patent Laid-Open No. 09-163382 (U.S. Pat. No. 5,929,906) describes correction of color misregistration due to the characteristics of an image output device. According to this reference, color separation values are corrected using spectral reflectance in an intermediate colorimetric system. However, tristimulus values under a predetermined light source are used to optimize correction.

Also, Japanese Patent Laid-Open No. 05-296836 describes that evaluation for optimizing object colors is made using the square means (RMS error) of spectral distribution errors for respective wavelengths, which is given by:

$$(\text{RMS Error}) = \sum_{\lambda=380nm}^{780nm} \sqrt{\frac{\{R(\lambda) - o(\lambda)\}^2}{n}} \tag{8}$$

where $R(\lambda)$ is the spectral distribution function of a color to be evaluated (to be referred to as an evaluation color hereinafter), and $o(\lambda)$ is that of a target color, in place of the tristimulus value difference, and a color conversion process is executed based on this evaluation.

Furthermore, Japanese Patent Laid-Open No. 2001-008047 (EP1054560A) describes a method of executing a color conversion process by evaluating errors for respective wavelengths by a method of calculating the square mean after errors for respective wavelengths are multiplied by a weighting function generated from a CIE color matching function (to be simply referred to as a color matching function hereinafter) as visual characteristics depending on wavelengths.

However, upon conversion into, e.g., tristimulus values L*a*b*, since conversion into three stimulus values is made using the spectral reflectance of an object as a continuous function in a visible wavelength range (about 380 to 780 nm), different spectral distributions are often converted into identical tristimulus values. For this reason, even when tristimulus values match those of an original under a given illumination, a change in illumination light source brings about a different change in tristimulus values, and original and reproduction colors have different color appearances.

For example, two spectral reflectance characteristics shown in FIGS. 13A and 13B are converted into equal tristimulus values under CIE supplementary standard light D50, but into different tristimulus values under CIE standard light A. That is, even when the color difference between two objects becomes zero under a given light source, metamerism is effected under only that condition, and the color difference may increase under another light source.

In Japanese Patent Laid-Open No. 09-163382 that discloses the technique associated with correction of color misregistration due to the characteristics of an image output device, color separation values are corrected using spectral reflectance in an intermediate colorimetric system, but tristimulus values under a predetermined light source are used to optimize correction. For this reason, a change in light source results in a change in optimization result.

In the method of making evaluation using the square mean (RMS error) of spectral distribution errors for respective wavelengths, as described in Japanese Patent Laid-Open No. 05-296836, no problem of matching of colors due to metamerism occurs, but a simple square mean of errors for respective wavelengths of the spectral distribution is used, and light source information and visual characteristics are not taken into consideration. Therefore, the color difference may increase even when two colors have close spectral distributions. For example, if the spectral distribution of an original is as shown in FIG. 14A, a spectral distribution in FIG. 14B has a smaller RMS error than that in FIG. 14C. However, under CIE supplementary standard light D50, the spectral distribution in FIG. 14C has smaller $\Delta E$, and color appearance of FIG. 14C is closer to the original color (FIG. 14A) than FIG. 14B. Hence, the evaluation results and color appearance have gaps.

Furthermore, Japanese Patent Laid-Open No. 2001-008047 considers neither light source information nor visual characteristics having nonlinearity with respect to brightness. For this reason, the same weight is used independently of the contrast (spectral distribution shape) of an object. As a result, a color with the best evaluation value does not always have a minimum error of color appearance.

SUMMARY OF THE INVENTION

The present invention has been made to solve the aforementioned problems, and has as its object to calculate a precision evaluation value, which has high correlation with actual color appearance and is used to improve color matching precision independently of a change in condition such as a light source or the like.

According to one aspect of the present invention, the foregoing object is achieved by providing a color evaluation method for evaluating precision of color matching of an evaluation color with respect to a target color, comprising: a calculation step of calculating a difference between spectral distribution data of the evaluation color and spectral distribution data of the target color; a first acquisition step of acquiring first weighting data calculated from the spectral distribution data of the target color; a second acquisition step of acquiring second weighting data calculated from spectral distribution data of a light source; and an evaluation step of calculating an evaluation value used to evaluate the precision of color matching of the evaluation color with respect to the target color using the difference between the spectral distribution data, and the first and second weighting data.

Preferably, the calculation step includes a difference step of calculating differences between spectral reflectance characteristics of the evaluation and target values for respective wavelengths, and the evaluation step includes a step of applying the first and second weighting data to the differences for respective wavelengths calculated in the difference step, calculating a sum total of the differences, and using the sum total as the evaluation value.

According to one aspect of the present invention, the foregoing object is achieved by providing a color evaluation apparatus for evaluating precision of color matching of an evaluation color with respect to a target color, comprising: a calculation unit adapted to calculate a difference between spectral distribution data of the evaluation color and spectral distribution data of the target color; a first acquisition unit adapted to acquire first weighting data calculated from the spectral distribution data of the target color; a second acquisition unit adapted to acquire second weighting data calculated from spectral distribution data of a light source; and an evaluation unit adapted to calculate an evaluation value used to evaluate the precision of color matching of the evaluation color with respect to the target color using the difference between the spectral distribution data, and the first and second weighting data.

Preferably, the calculation unit includes a difference unit adapted to calculate differences between spectral reflectance characteristics of the evaluation and target values for respective wavelengths, and the evaluation unit applies the first and second weighting data to the differences for respective wavelengths calculated in the difference unit, calculates a sum total of the differences, and uses the sum total as the evaluation value.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

Preferred embodiments of the present invention will now be described in detail in accordance with the accompanying drawings.

(First Embodiment)

Figure 1:
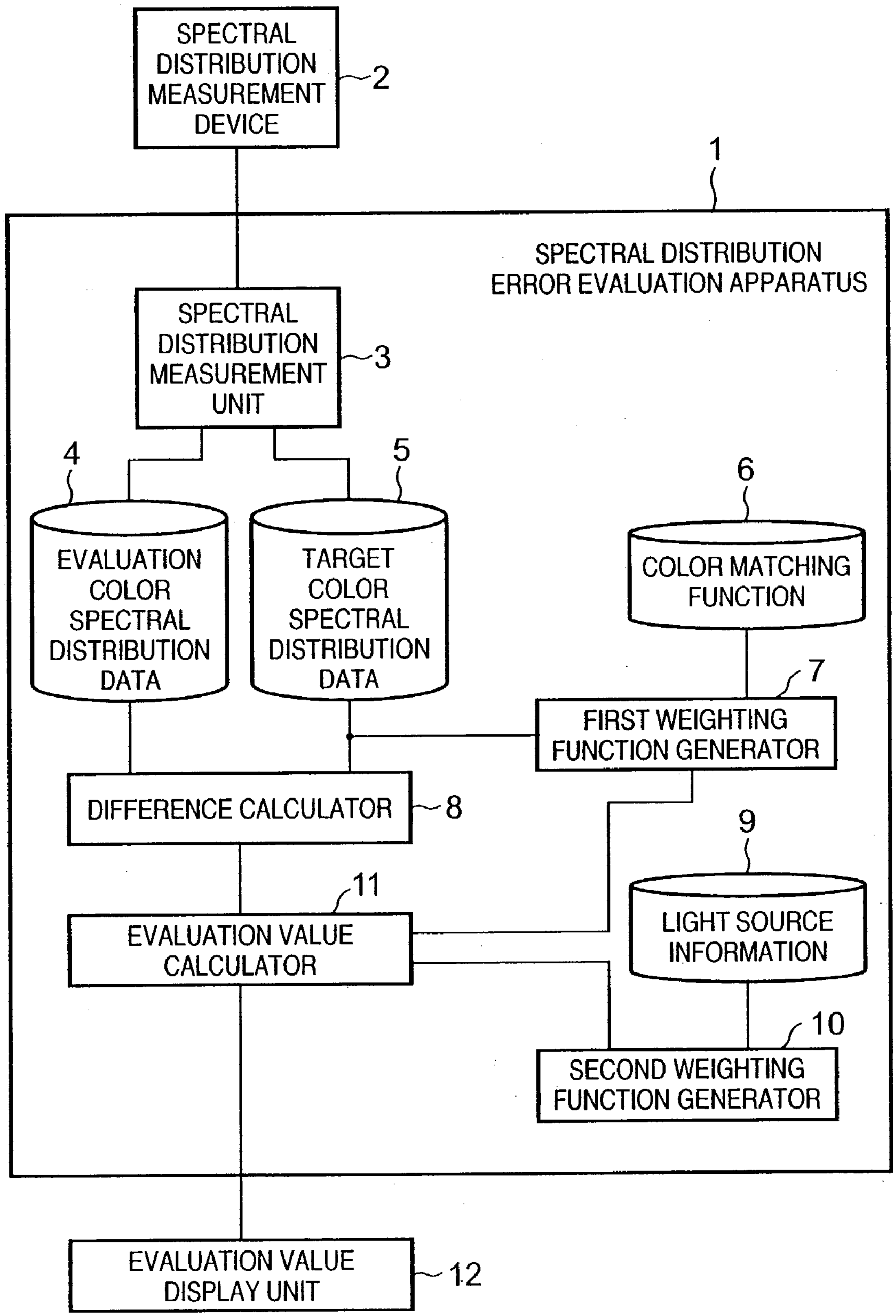
FIG. 1 is a block diagram showing the arrangement of a spectral distribution error evaluation apparatus according to the first embodiment.

FIG. 1 is a block diagram showing the arrangement of a spectral distribution error evaluation apparatus according to the first embodiment. Referring to FIG. 1, reference numeral 1 denotes a spectral distribution error evaluation apparatus of this embodiment.

Reference numeral 2 denotes a spectral distribution measurement device, which measures the spectral distribution of an object. The spectral distribution measurement device comprises, e.g., a spectrophotometer. Reference numeral 3 denotes a spectral distribution measurement unit, which controls the spectral distribution measurement device 2. Reference numeral 4 denotes an evaluation color spectral distribution data storage unit, which stores the spectral distribution of an object to be evaluated (evaluation color spectral distribution) output from the spectral distribution measurement unit 3. Reference numeral 5 denotes a target color spectral distribution data storage unit, which stores the spectral distribution of a target color (target color spectral distribution) output from the spectral distribution measurement unit 3. Reference numeral 6 denotes a color matching function storage unit, which stores color matching functions shown in FIG. 4A.

Reference numeral 7 denotes a first weighting function generator, which generates a first weighting function using the target color spectral distribution stored in the target color spectral distribution data storage unit 5, and the color matching functions stored in the color matching function storage unit 6. Reference numeral 8 denotes a difference calculator, which calculates the difference between the evaluation color spectral distribution stored in the evaluation color spectral distribution storage unit 4, and the target color spectral distribution stored in the target color spectral distribution storage unit 5. Reference numeral 9 denotes a light source information storage unit, which stores the spectral distributions of a plurality of light sources. Reference numeral 10 denotes a second weighting function generator, which generates a second weighting function using the light source information stored in the light source information storage unit 9.

Reference numeral 11 denotes an evaluation value calculator, which calculates a spectral distribution error evaluation value using the spectral distribution difference calculated by the difference calculator 8, the first weighting function generated by the first weighting function generator 7, and the second weighting function generated by the second weighting function generator 10. Reference numeral 12 denotes an evaluation value display unit, which comprises a display such as a CRT, LCD, or the like, and displays the evaluation value calculated by the evaluation value calculator 11.

<Spectral Distribution Error Evaluation Process>

Figure 2:
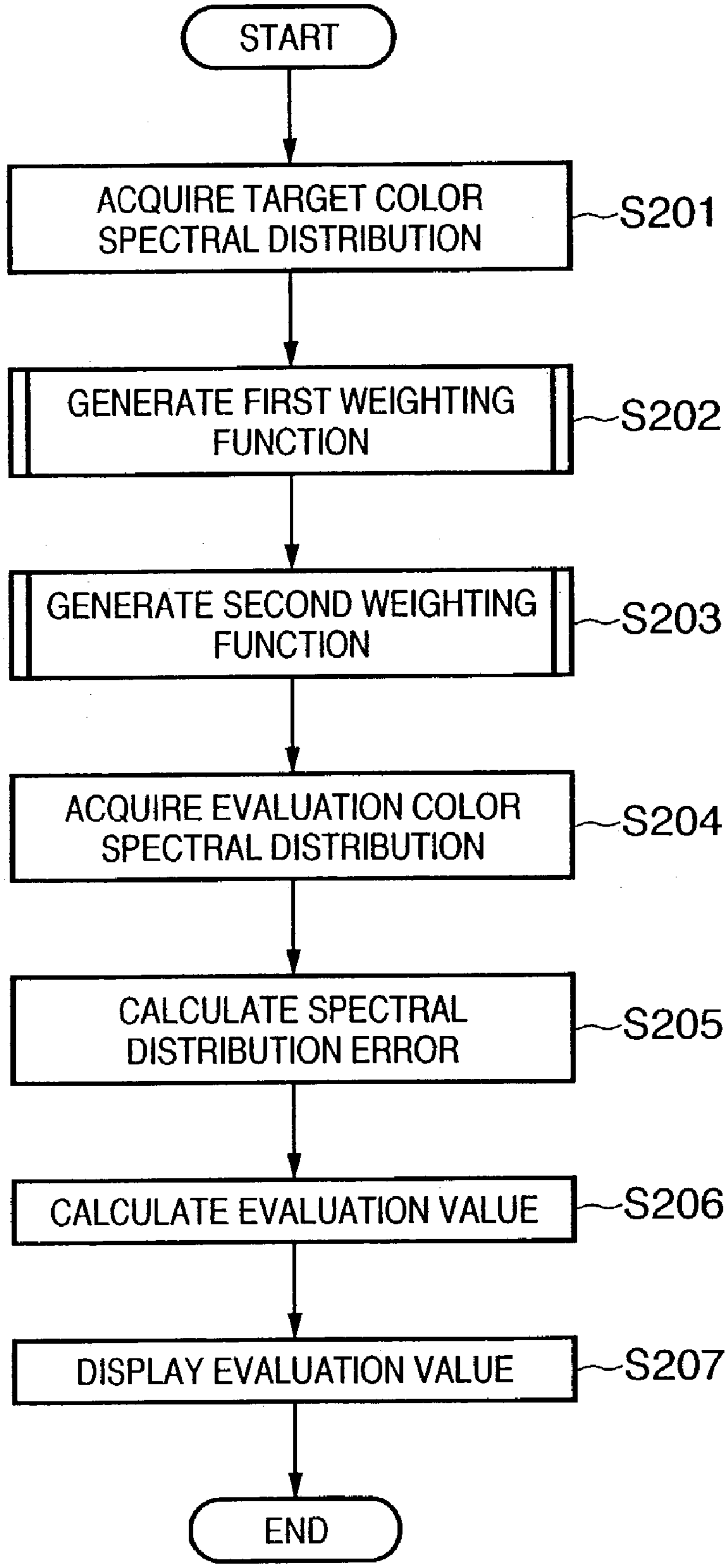
FIG. 2 is a flow chart for explaining an evaluation process in the spectral distribution error evaluation apparatus according to the first embodiment.

The spectral distribution error evaluation process according to this embodiment will be described below. FIG. 2 is a flow chart for explaining an evaluation process executed by the spectral distribution error evaluation apparatus 1 of this embodiment.

In step S201, the spectral distribution measurement unit 3 measures the spectral distribution of a target color using the spectral distribution measurement device 2 in accordance with a user's instruction, and saves the obtained spectral distribution data in the target color spectral distribution storage unit 5. In step S202, the first weighting function generator 7 generates a first weighting function using the color matching functions pre-stored in the color matching function storage unit 6 of the apparatus, and the target color spectral distribution data stored in the target color spectral distribution data storage unit 5. In step S203, the second weighting function generator 10 generates a second weighting function using the light source information stored in the light source information storage unit 9.

In step S204, the spectral distribution measurement unit 3 measures the spectral distribution of an evaluation color using the spectral distribution measurement device 2 in accordance with a user's instruction, and saves the obtained spectral distribution data in the evaluation color spectral distribution storage unit 4. Furthermore, in step S205 the difference calculator 8 calculates the difference (spectral distribution error) between the aforementioned target and evaluation color spectral distribution data. In step S206, the evaluation value calculator 11 calculates an evaluation value using the aforementioned spectral distribution error, and the first and second weighting functions. In this embodiment, the evaluation value is calculated by:

$$E=\sum_{\lambda=380\,nm}^{780\,nm}|R_1(\lambda)-R_2(\lambda)|\cdot w_1(\lambda)\cdot w_2(\lambda) \tag{9}$$

where $R_1(\lambda)$ is the spectral distribution function of an evaluation color, $R_2(\lambda)$ is the spectral distribution function of a target color, and $w_1$ and $w_2$ are the first and second weighting functions (to be described in detail later).

Figure 12:
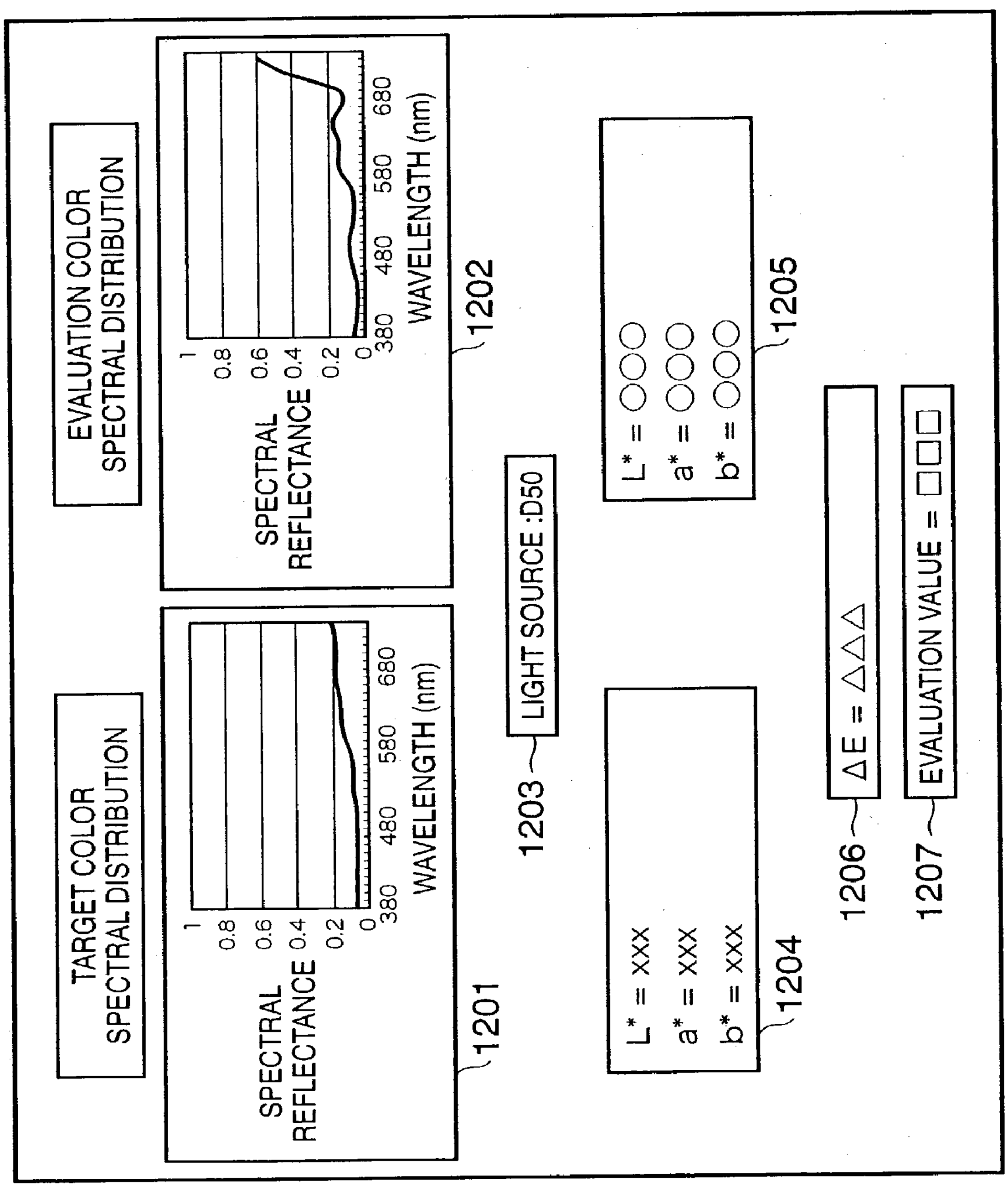
FIG. 12 shows a display example of an evaluation value according to the first embodiment.
Figure 13A:
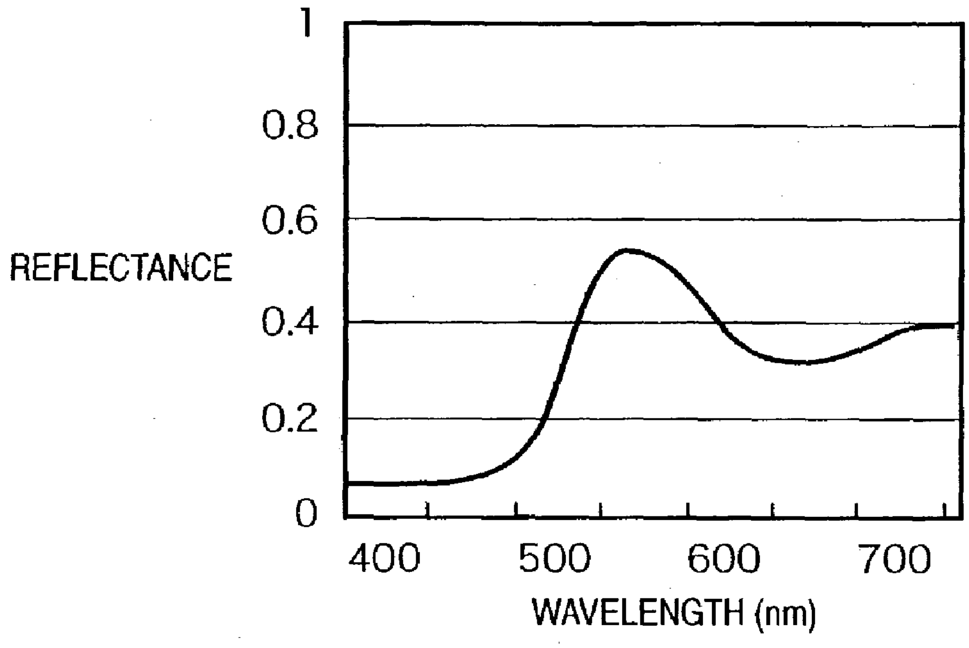
FIGS. 13A and 13B show an example of two spectral reflectance characteristics that effect metamerism under CIE supplementary standard light D50.
Figure 13B:
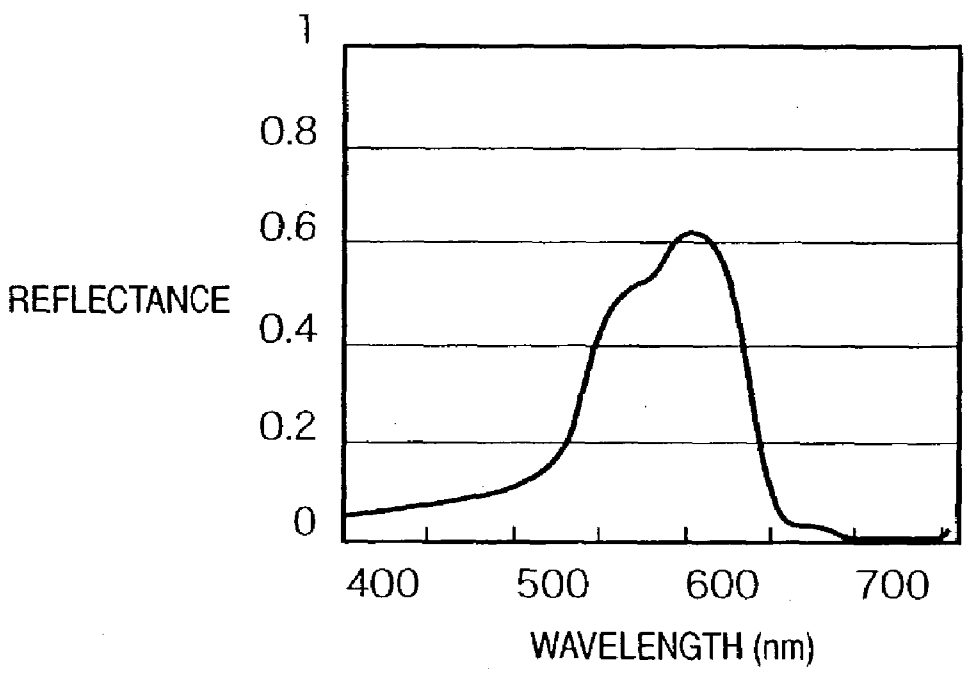
Figure 14A:
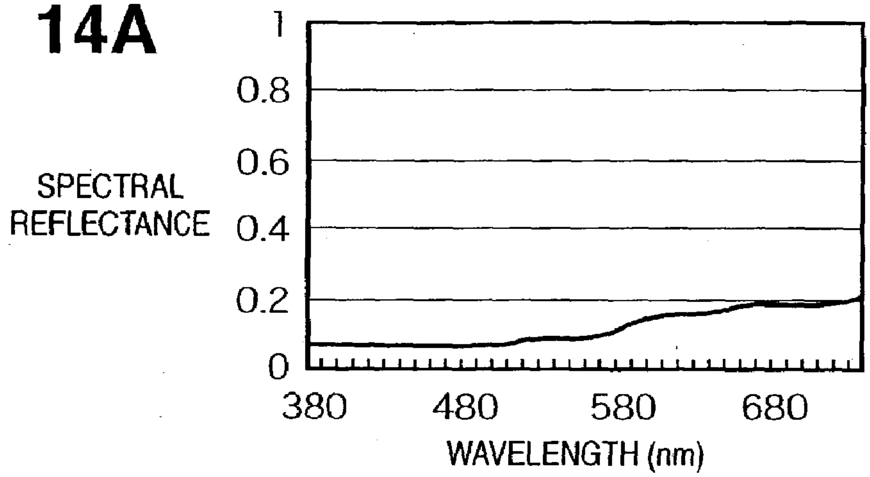
FIG. 14A shows the spectral distribution of an original color.
Figure 14B:
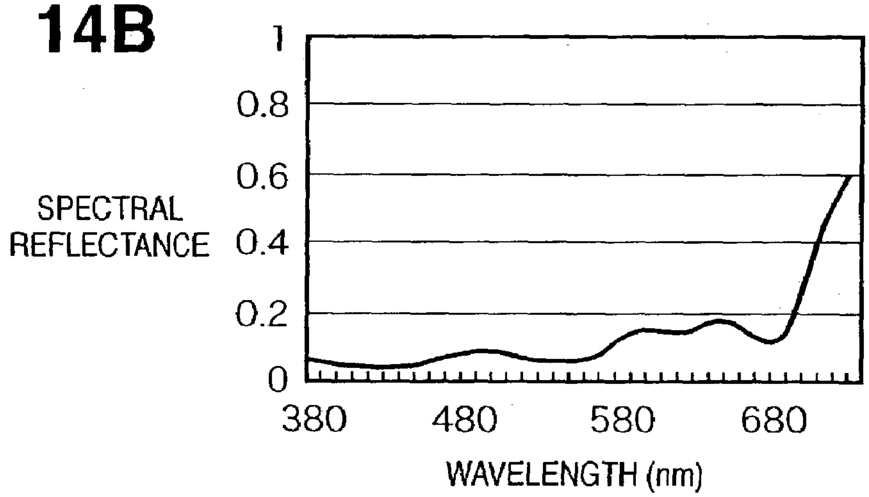
FIG. 14B shows a spectral distribution that reproduces the color in FIG. 14A.
Figure 14C:
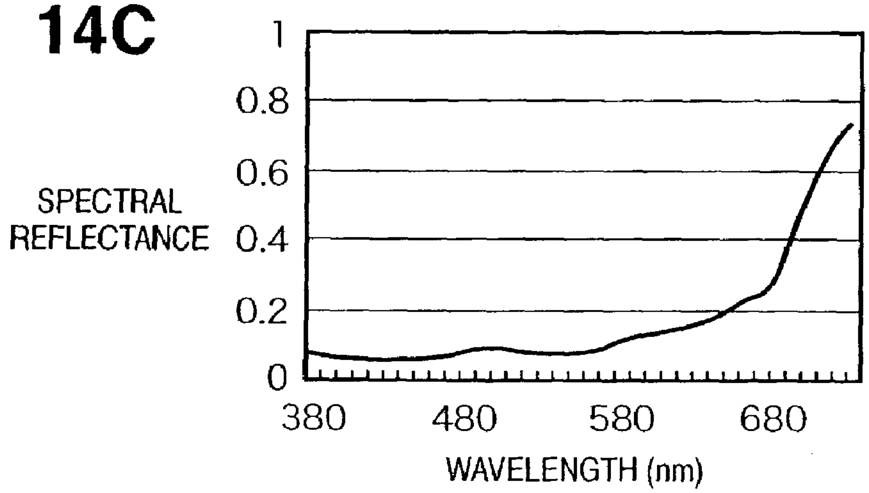
FIG. 14C shows another spectral distribution that reproduces the color in FIG. 14A.

In step S207, the calculated evaluation value is displayed by a display method shown in, e.g., FIG. 12.

In FIG. 12, reference numeral 1201 denotes a spectral distribution function of a target color; and 1201, a spectral distribution function of an evaluation color. Reference numerals 1204 and 1205 denote L*a*b* display areas, which display the L*a*b* values of the target and evaluation colors under a light source (D50 in FIG. 12) selected from a light source designation area 1203. Reference numeral 1206 denotes a color difference display area, which displays a value obtained by calculating the color difference between the data on the L*a*b* display areas 1204 and 1205 in accordance with equation (1). Reference numeral 1207 denotes an evaluation value display area, which displays a value calculated according to equation (9).

<First Weighting Function Calculation>

Figure 3:
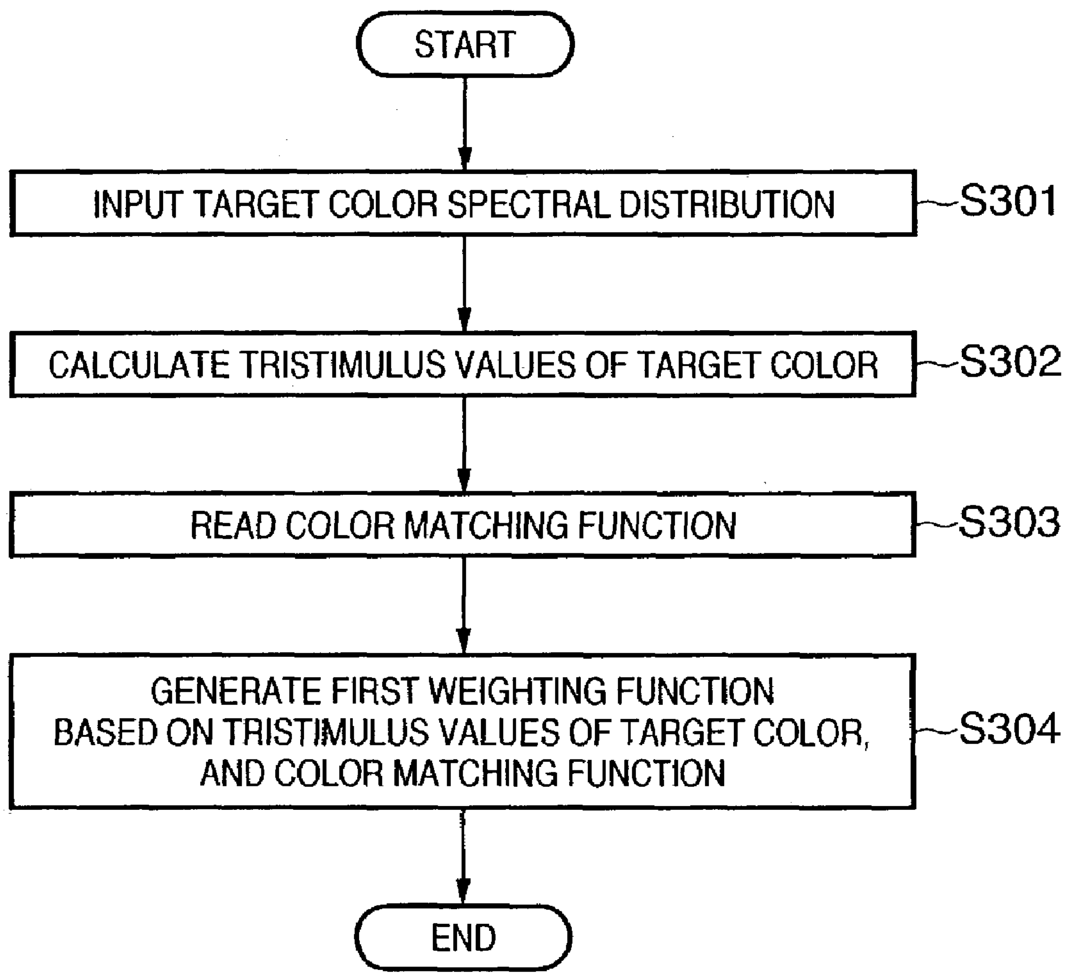
FIG. 3 is a flow chart for explaining a first weighting function generation process.

Details of the first weighting function calculation process by the first weighting function generator (step S202) will be described below using FIG. 3 and FIGS. 4A and 4B.

In step S301, the first weighting function generator 7 loads spectral reflectance data of a target color from the target color spectral distribution data storage unit 5. In step S302, tristimulus values X, Y, and Z, which do not contain any light source information, of the spectral reflectance data read by the first weighting function generator 7 are calculated by:

$$X = k\int_{380nm}^{780nm} R(\lambda)\bar{x}(\lambda)d\lambda \tag{10}$$

$$Y = k\int_{380nm}^{780nm} R(\lambda)\bar{y}(\lambda)d\lambda \tag{11}$$

$$Z = k\int_{380nm}^{780nm} R(\lambda)\bar{z}(\lambda)d\lambda \tag{12}$$

$$\text{for } k = \frac{100}{\int_{380nm}^{780nm}\bar{y}(\lambda)}$$

Figure 4A:
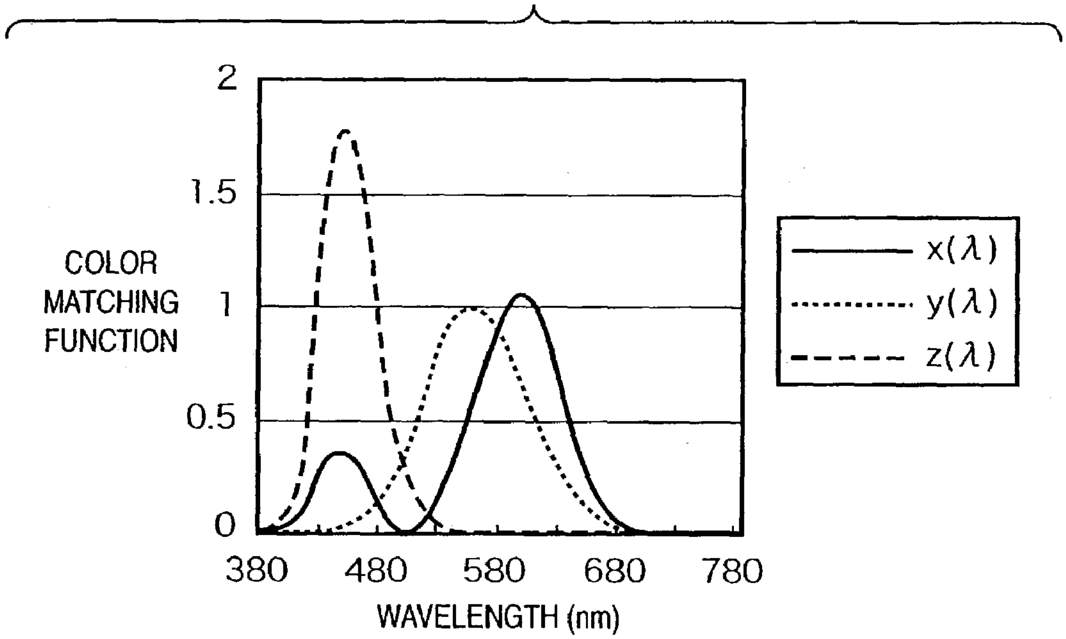
FIG. 4A shows CIE color matching functions.

Furthermore, in step S303 the first weighting function generator 7 loads the color matching functions shown in FIG. 4A from the color matching function storage unit 6. In step S304, the first weighting function generator 7 generates a first weighting function $w_1$ using the tristimulus values calculated in step S302 and the color matching functions loaded in step S303, and in consideration of nonlinearity with respect to brightness.

Note that the human eye perceives a larger error of a dark object than of a bright object. Hence, as the object brightness is higher, a smaller weight on an error is calculated by:

$$\begin{aligned} w_1(\lambda) = 116\times\left|\bar{y}(\lambda)\cdot Y^{-\frac{2}{3}}\right| + \\ 500\times\left|\bar{x}(\lambda)\cdot X^{-\frac{2}{3}} - \bar{y}(\lambda)\cdot Y^{-\frac{2}{3}}\right| + \\ 200\times\left|\bar{y}(\lambda)\cdot Y^{-\frac{2}{3}} - \bar{z}(\lambda)\cdot Z^{-\frac{2}{3}}\right| \end{aligned} \tag{13}$$

Figure 4B:
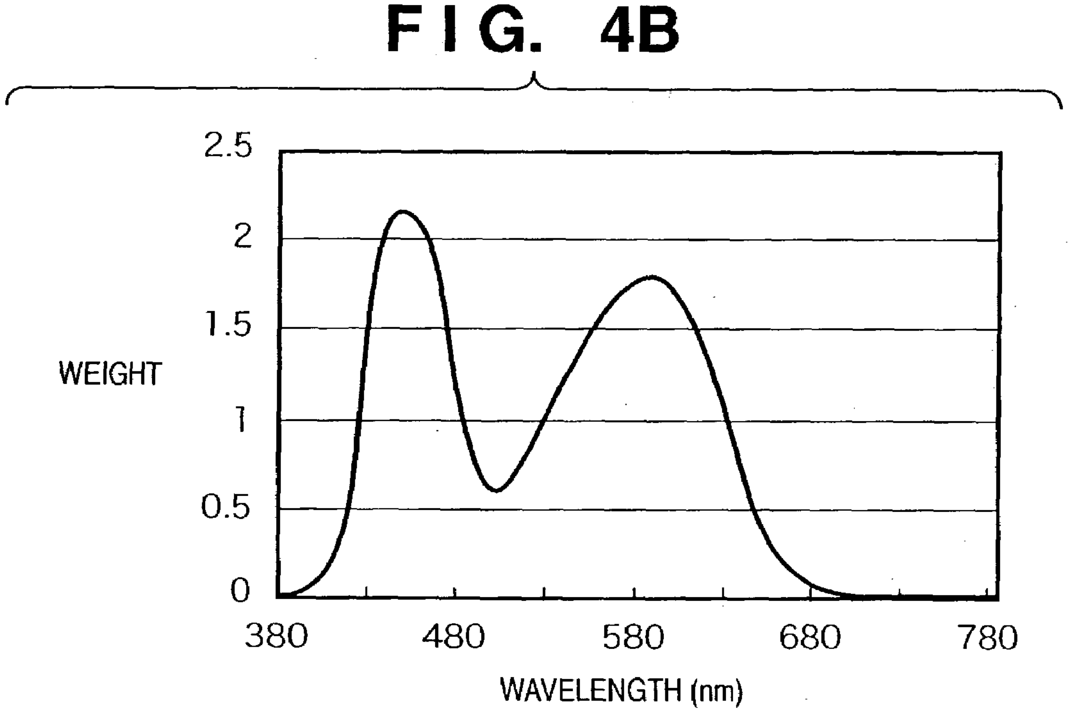
FIG. 4B shows an example of a first weighting function.
Figure 5:
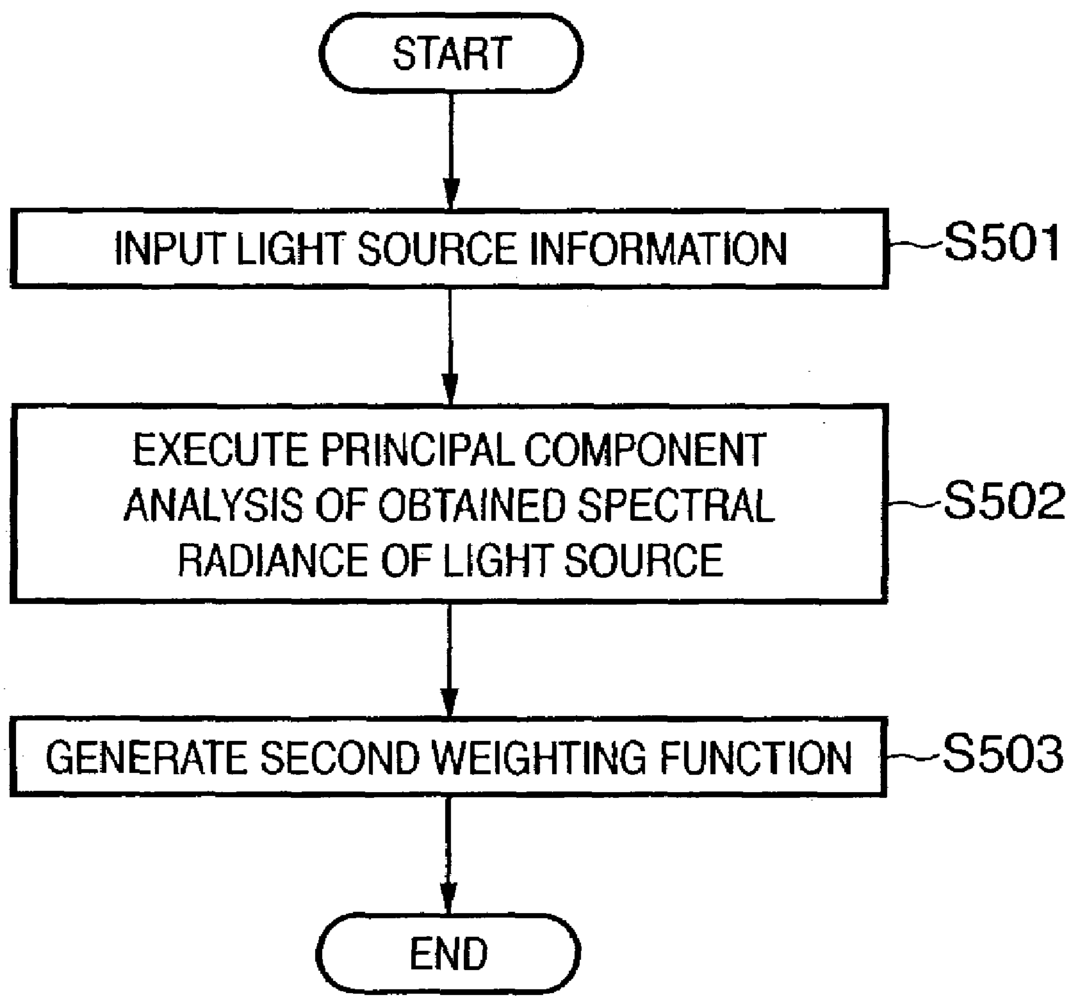
FIG. 5 is a flow chart for explaining a second weighting function generation process.

FIG. 4B shows the weighting function calculation result of equation (13).

Note that coefficients "116", "500", and "200" in equation (13) are used in correspondence with those upon calculating tristimulus values L*a*b* in equations (5) to (7). Also, X, Y, and Z represent the tristimulus values of an original object calculated in step S302. The X, Y, and Z values become larger and the weighting function $w_1$ consequently becomes smaller with increasing reflectance of an object.

<Second Weighting Function Calculation>

Details of the second weighting function calculation process by the second weighting function calculator 10 (step S203) will be described below using FIG. 5 and FIGS. 6A to 6C.

In step S501, the second weighting function generator 10 loads some or all pieces of light source information of light sources selected by the user from those registered in advance in the light source information storage unit 9. In step S502, the loaded light source information undergoes principal component analysis to calculate principal components and their contribution ratios (the contribution ratios are obtained for respective orders, and the sum of the contribution ratios of all orders is 1). In step S503, a second weighting function $w_2$ is calculated based on the principal components and their contribution ratios by:

$$w_2(\lambda) = \sum_{i=1}^{n} b_i e_i(\lambda) \tag{14}$$

Figure 6A:
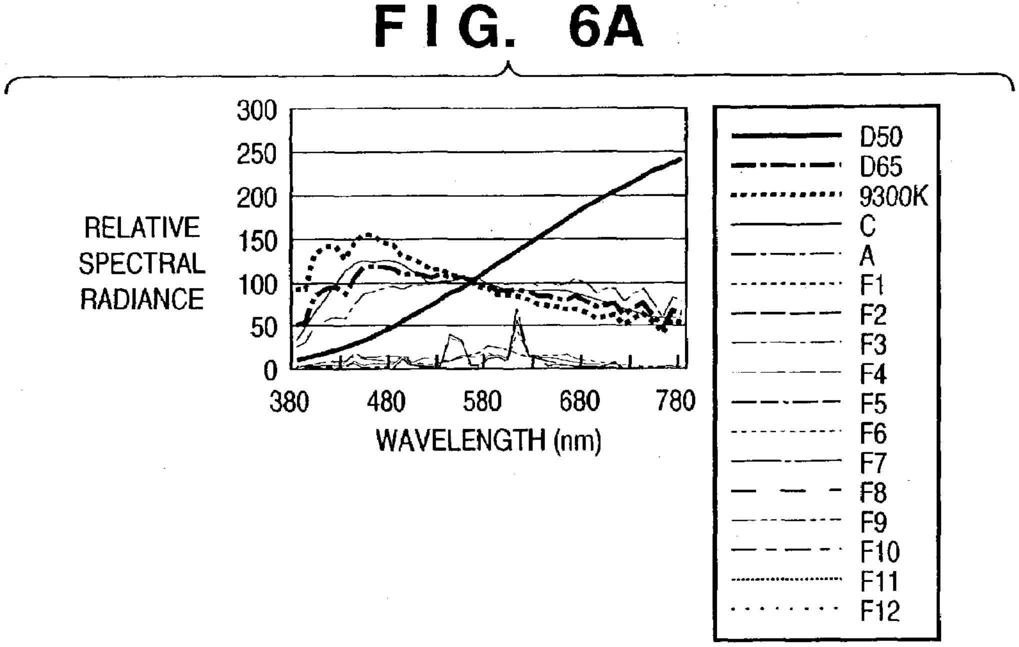
FIG. 6A shows the relative spectral emissivity characteristics of 17 difference typical illumination light sources.
Figure 6B:
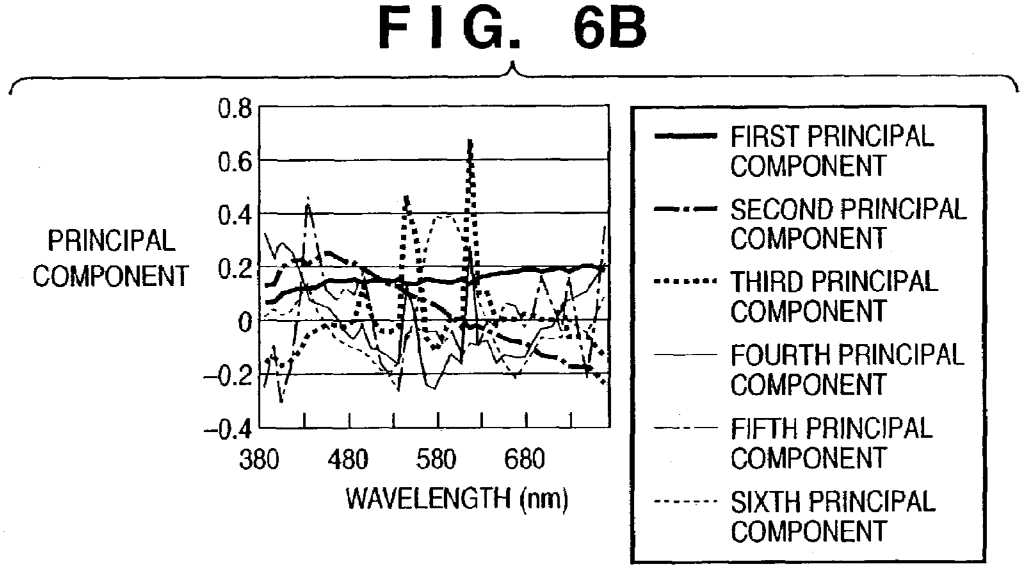
FIG. 6B shows the principal component analysis results of the illumination light sources shown in FIG. 6A.
Figure 6C:
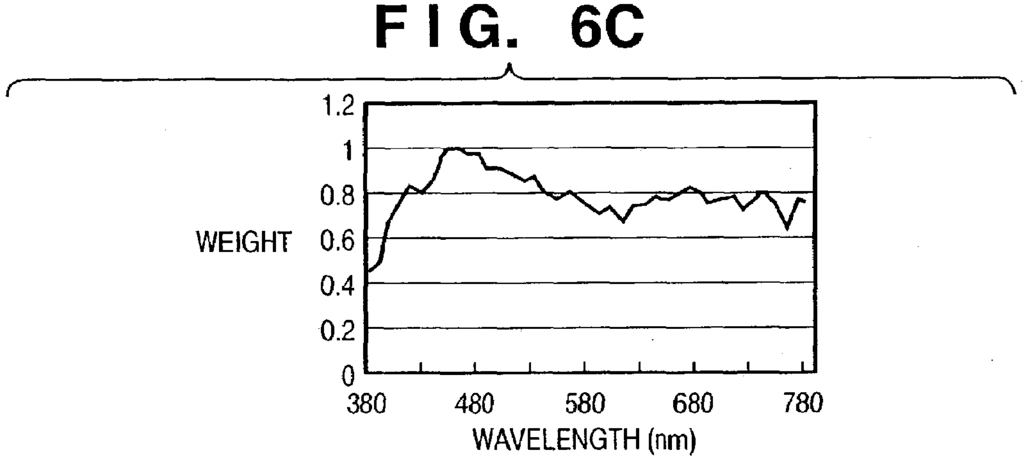
FIG. 6C shows a second weighting function calculated from the principal component analysis results shown in FIG. 6B.

$e_i(\lambda)$: i-th order principal component $b_i$: contribution ratio of i-th order principal component FIGS. 6A to 6C show an example of these processes. FIG. 6A shows 17 different light sources as examples of general illumination light sources, FIG. 6B shows principal components up to the sixth order of these light sources (principal components up to sixth order when all the 17 different light sources in FIG. 6A undergoes principal component analysis), and FIG. 6C shows the weighting function calculated by equation (14). Note that the light source information storage unit 9 stores light source information of the 17 different light sources shown in FIG. 6A (each information indicates the relationship between the wavelength and relative spectral emissivity shown in FIG. 6A).

Figure 7:
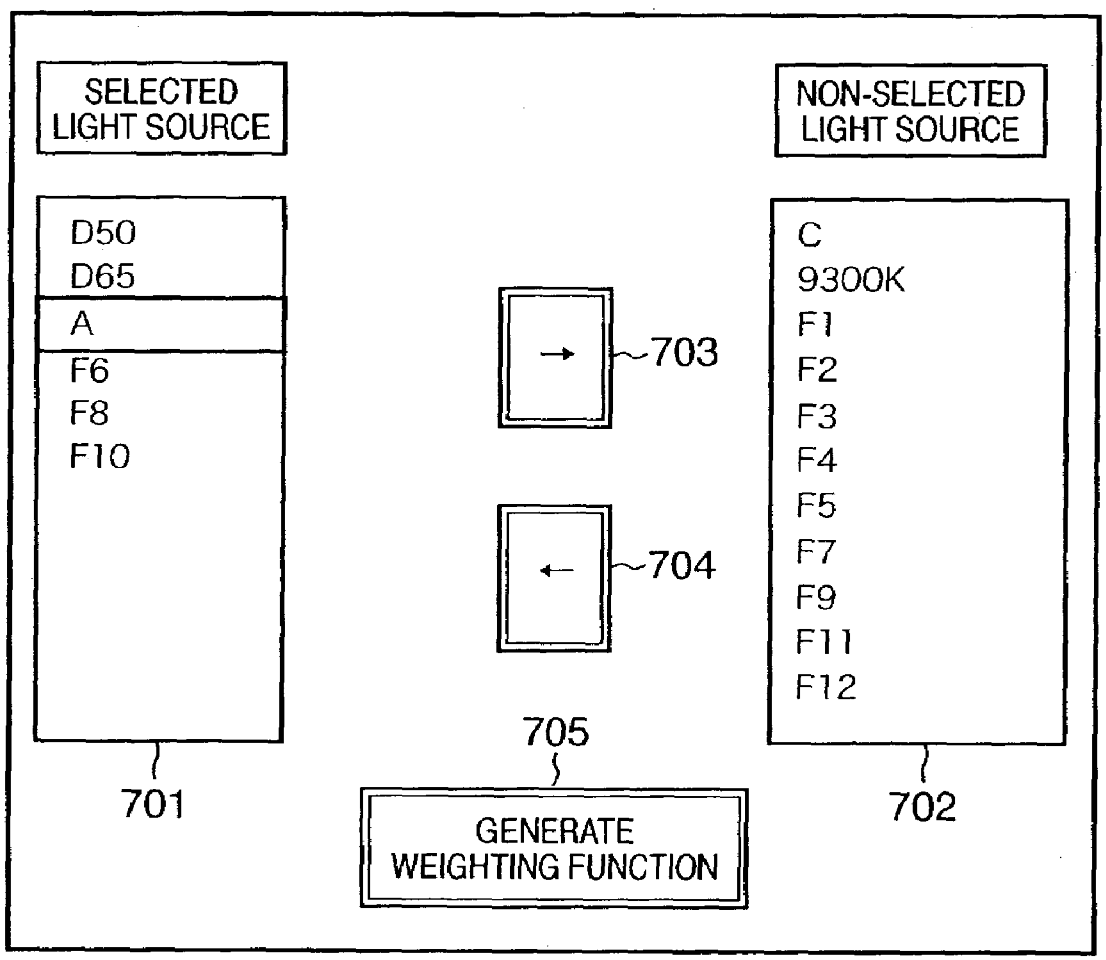
FIG. 7 shows an example of a user interface in the second weighting function generation process according to the first embodiment.

FIG. 7 shows an example of a user interface used upon generating the second weighting function. A selected light source window 701 displays light source names selected as light source information by the user, and a non-selected light source window 702 displays those which are not selected by the user. The user clicks a selected light source name or non-selected light source name, and then presses a move button 703 or 704, thereby moving the desired light source name to the selected light source window 701 or the non-selected light source window 702. Finally, the user presses a weighting function generation button 705 to generate the second weighting function using only the light source information displayed on the selected light source window 701.

Figure 8A:
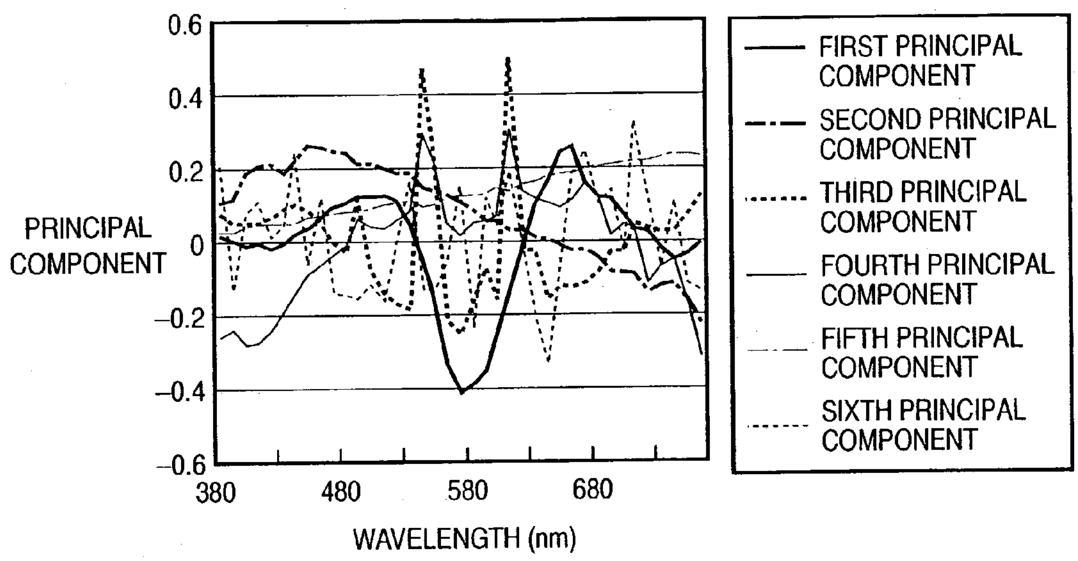
FIG. 8A shows the principal component analysis results of illumination light source in a selected light source list shown in FIG. 7.
Figure 8B:
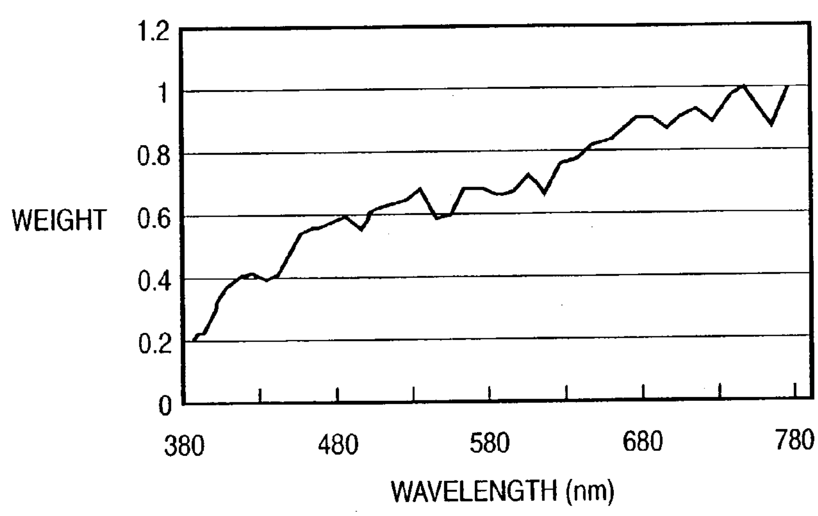
FIG. 8B shows a second weighting function calculated from the principal component analysis results shown in FIG. 8A.

FIGS. 8A and 8B show a generation example of the second weighting functions using only some pieces of light source information. FIG. 8A shows the principal component analysis results of six different light sources displayed on the selected light source window 701 in FIG. 7, and FIG. 8B shows the weighting function calculated based on the six pieces of different light source information using equation (13).

As described above, according to this embodiment, since the first weighting function $w_1$ based on the visual characteristics and the second weighting function $w_2$ based on the light source information are generated and used, a precision evaluation value used to improve the color matching precision can be calculated.

(Second Embodiment)

Figure 9:
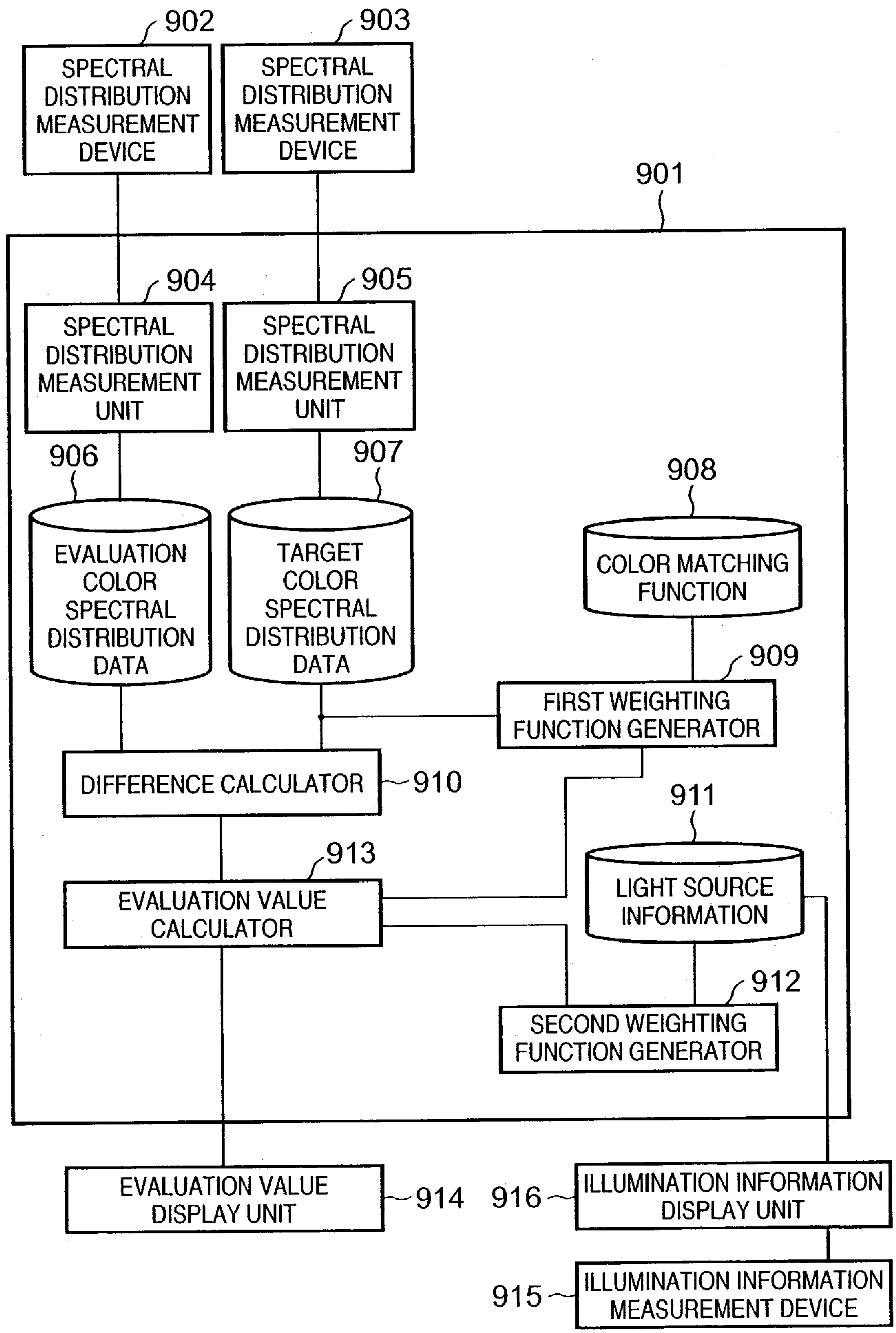
FIG. 9 is a block diagram showing the arrangement of a spectral distribution error evaluation apparatus according to the second embodiment.

The second embodiment of the present invention will be described in detail below with reference to the accompanying drawings. FIG. 9 is a block diagram showing the arrangement of an image processing apparatus according to the second embodiment of the present invention. Reference numeral 901 denotes a spectral distribution error evaluation apparatus according to the second embodiment.

Reference numerals 902 and 903 denote devices, each of which comprises a spectrophotometer or the like, and is used to measure the spectral distribution of an object. Reference numerals 904 and 905 denote spectral distribution measurement units, which respectively control the spectral distribution measurement devices 902 and 903. Reference numeral 906 denotes an evaluation color spectral distribution data storage unit, which stores spectral distribution data output from the spectral distribution measurement unit 904. Reference numeral 907 denotes a target color spectral distribution data storage unit, which stores spectral distribution data output from the spectral distribution measurement unit 905.

Reference numeral 908 denotes a color matching function storage unit, which stores color matching functions. Reference numeral 909 denotes a first weighting function generator, which generates a first weighing function using the spectral distribution stored in the target color spectral distribution data storage unit 907, and the color matching functions stored in the color matching function storage unit 908. Reference numeral 910 denotes a difference calculator, which calculates the difference between the spectral distribution of a sample object stored in the target color spectral distribution data storage unit 907, and that of an evaluation object stored in the evaluation color spectral distribution data storage unit 906.

Reference numeral 911 denotes a light source information storage unit, which stores the light source distributions of a plurality of light sources as in the light source information storage unit 9 of the first embodiment. The light source information storage unit 911 of the second embodiment stores illumination information measured by an illumination information measurement device 915 in addition to the above information. Reference numeral 912 denotes a second weighting function generator, which generates a second weighting function using the light source information stored in the light source information storage unit 911. Reference numeral 913 denotes an evaluation value calculator, which calculates a spectral distribution error evaluation value using the spectral distribution of an evaluation object stored in the evaluation color spectral distribution data storage unit 906, the spectral distribution of a sample object stored in the target color spectral distribution data storage unit 907, and the first and second weighting functions generated by the first and second weighting function generators 909 and 912.

Reference numeral 914 denotes an evaluation value display unit, which comprises a CRT, LCD, or the like, and displays the evaluation value calculated by the evaluation value calculator 913. The illumination information measurement device 915 comprises a spectral radiance meter or the like, and measures the spectral distribution of an environmental illumination light source. Reference numeral 916 denotes an illumination information display unit, which displays illumination information measured by the illumination information measurement device 915.

<Spectral Distribution Error Evaluation Process>

Figure 10:
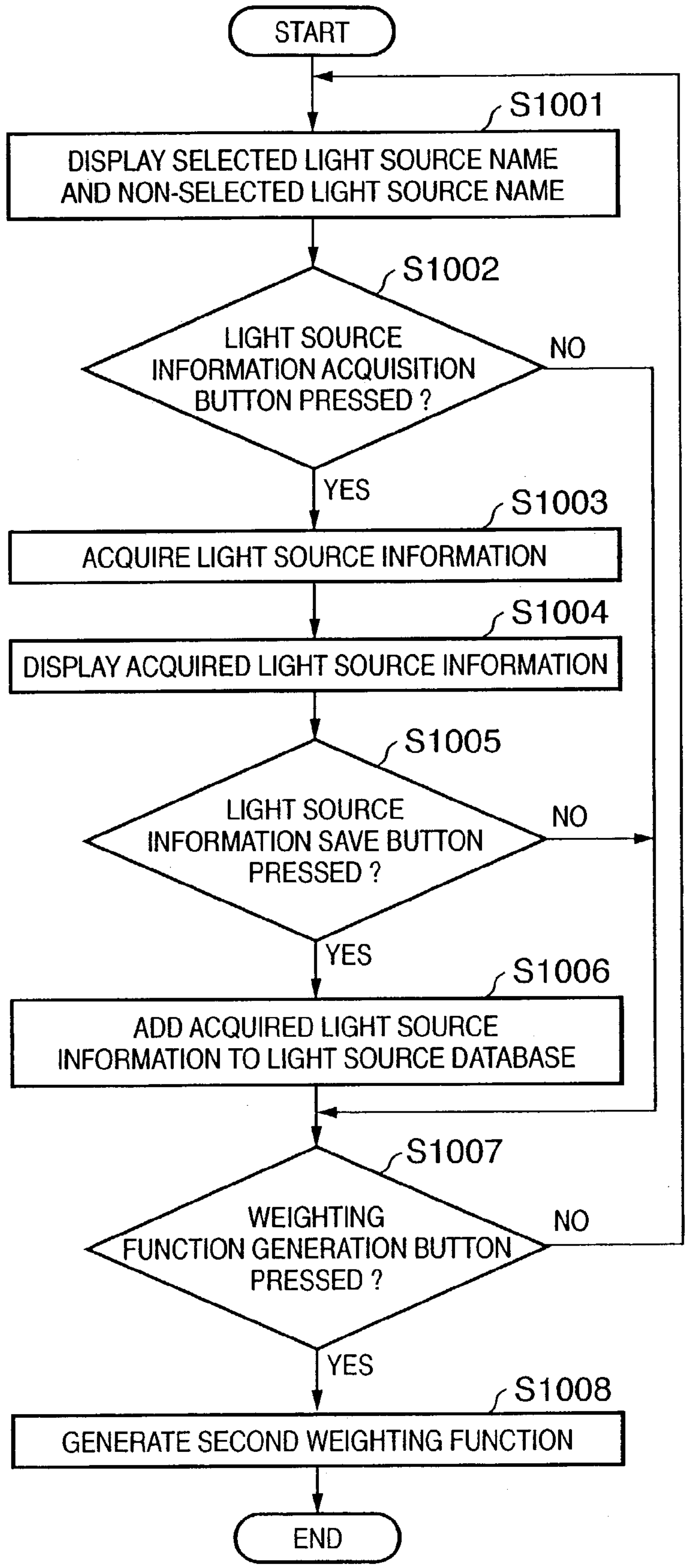
FIG. 10 is a flow chart showing a second weighting function generation process according to the second embodiment.

An outline of the spectral distribution error evaluation process by the spectral distribution error evaluation apparatus of the second embodiment is substantially the same as that of the first embodiment (flow chart shown in FIG. 2), except for the second weighting function generation process in step S203. The second weighting function generation method of the second embodiment will be described in detail blow with reference to the block diagram of FIG. 9, the flow chart of FIG. 10, and a user interface example of FIG. 11.

In step S1001, light source names selected by the user as light source information are displayed on a selected light source window 1101, and light source names which are not selected by the user are displayed on a non-selected light source window 1102. At this time, as described in the second weighting function generation process of the first embodiment, the user clicks a selected light source name or non-selected light source name, and then presses a move button 1103 or 1104, thereby moving the desired light source name to the selected light source window 1101 or the non-selected light source window 1102.

It is checked in step S1002 if the user has pressed a light source information acquisition button 1107. If YES in step S1002, the flow advances to step S1003; otherwise, the flow jumps to step S1007.

In step S1003, the illumination information measurement device 915 acquires environmental illumination information. In step S1004, the illumination information acquired in step S1003 is displayed by the illumination information display unit 916. It is checked in step S1005 if the user has pressed a light source information save button 1108. If YES in step S1105, the flow advances to step S1006. In step S1006, light source information acquired in step S1003 is added to the light source information storage unit 911, and the flow advances to step S1007. Note that the name of light source information added at that time can be designated on an information name designation window 1105. In this embodiment, a name "user designated light source 1" or the like is given. The added light source information can be set as a selected or non-selected light source as in those of other light sources.

On the other hand, if the light source information acquisition button 1107 has not been pressed, the flow jumps to step S1007 without the above process. It is checked in step S1007 if the user has pressed a weighting function generation button 1109. If YES in step S1007, the flow advances to step S1008; otherwise, the flow returns to step S1001. In step S1008, a second weighting function is generated using light source information of light source names displayed on the selected light source name display window in the same manner as in the second weighting function generation process described in the first embodiment.

An evaluation value obtained in this way is presented to the user via the same interface as in the first embodiment (FIG. 12).

<Wavelength Integration Range and Sampling Interval>

In each of the above embodiments, upon integrating the spectral distribution in a visible wavelength range, values sampled in 10-nm increments within the range from 380 nm to 780 nm are used. However, the present invention is not limited to such specific range and intervals in practice. For example, in order to improve the error evaluation precision, the range may be broadened, or the sampling intervals may be narrowed. Conversely, the range may be narrowed, and the sampling intervals may be broadened to reduce the calculation volume. That is, the integration range and sampling intervals can be changed in correspondence with the precision and calculation volume of user's choice.

<Weighting Function Calculation Method>

In each of the above embodiments, upon calculating the first weighting function, coefficients "116", "500", and "200", and exponent "−⅔" are used in equation (12). In practice, however, other coefficients and exponents may be used as long as they are determined in consideration of visual characteristics.

<Spectral Distribution Measurement Device>

The first embodiment (FIG. 1) uses only one pair of spectral distribution measurement device and spectral distribution measurement unit, while the second embodiment (FIG. 9) uses two pairs of spectral distribution measurement devices and spectral distribution measurement units in correspondence with target and evaluation colors. However, the number of pairs is not limited to one or two. Also, one pair may be used to eliminate errors among measurement devices, or two pairs may be used when the spectral distributions of target and evaluation colors must be acquired at the same time. In this way, the number of pairs may be changed in correspondence with the use purpose of the user.

In each of the above embodiments, the spectral distributions of target and evaluation colors are measured using the spectral distribution measurement device. In place of the spectral distributions measured by the spectral distribution measurement device, spectral distribution data measured in advance by another device may be input, or virtual spectral distributions obtained by, e.g., simulation may be used.

<User Interface>

Figure 11:
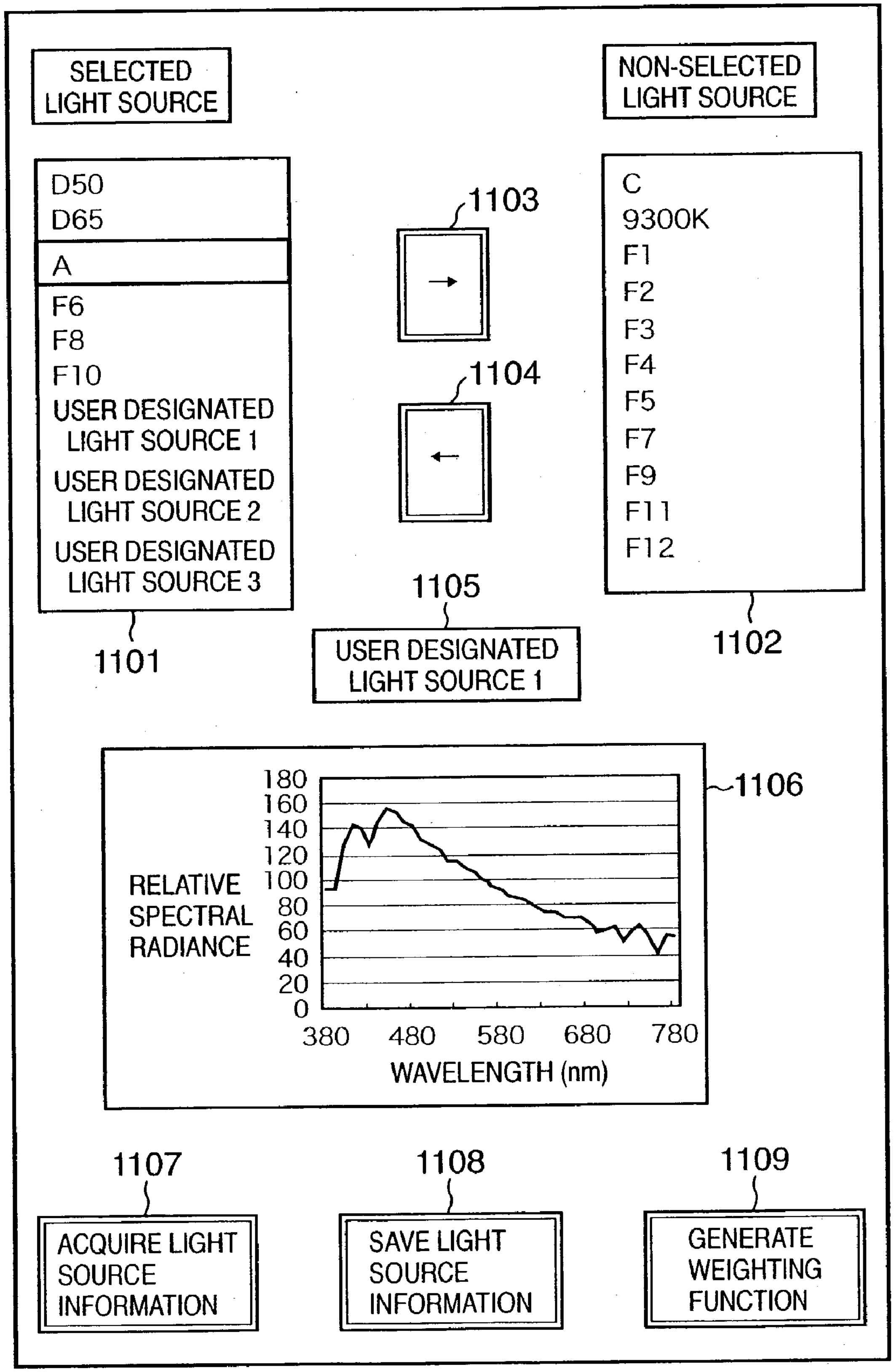
FIG. 11 shows an example of a user interface in the second weighting function generation process according to the second embodiment.

In each of the above embodiments, as the examples of the user interfaces in FIGS. 7 and 11, the user selects light source names displayed in the windows. However, the present invention is not limited to such specific method. For example, the user may directly input spectral radiance values for respective wavelengths of an arbitrary light source, or those values may be read from a file saved in advance. That is, the user interface configuration is not particularly limited as long as the user can make desired setups.

As described above, according to the above embodiments, upon color matching in different observation environments, a weighting function based on visual characteristics and a weighting function based on light source information are generated, and these two weighting functions are used. Hence, a precision evaluation value which has high correlation with actual color appearance and is used to improve the color matching precision can be calculated independently of a change in condition such as a light source or the like.

Furthermore, since the user can select light sources, unnecessary light source information can be excluded, and a high-precision evaluation value can be obtained.

<Storage Medium>

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, a precision evaluation value which has high correlation with actual color appearance and is used to improve the color matching precision can be calculated independently of a change in condition such as a light source or the like.

As many apparently widely different embodiments of the present invention can be made without departing from the spirit and scope thereof, it is to be understood that the invention is not limited to the specific embodiments thereof except as defined in the claims.

What is claimed is:

1. A color evaluation method for evaluating precision of color matching of an evaluation color with respect to a target color, comprising:

a calculation step of calculating a difference between spectral distribution data of the evaluation color and spectral distribution data of the target color;

a first acquisition step of acquiring first weighting data calculated from the spectral distribution data of the target color;

a second acquisition step of acquiring second weighting data calculated from spectral distribution data of a light source; and an evaluation step of calculating an evaluation value used to evaluate the precision of color matching of the evaluation color with respect to the target color using the difference between the spectral distribution data, and the first and second weighting data, wherein said calculation step includes a difference step of calculating differences between spectral reflectance characteristics of the evaluation and target values for respective wavelengths, and wherein said evaluation step includes a step of applying the first and second weighting data to the differences for respective wavelengths calculated in said difference step, calculating a sum total of the differences, and using the sum total as the evaluation value.

2. The method according to claim 1, wherein the first weighting data is calculated in accordance with brightness characteristics of a human eye.

3. The method according to claim 1, wherein the second weighting data is calculated from spectral distribution data of a plurality of different light sources.

4. The method according to claim 1, wherein types of light sources to be adopted in the second acquisition step can be manually selected.

5. The method according to claim 1, wherein said first acquisition step includes a step of generating the first weighting data on the basis of wavelength characteristics of the target color, which are independent of a light source, and human visual characteristics, which depend on wavelengths.

6. The method according to claim 5, wherein said first acquisition step includes steps of:

acquiring tristimulus values, which do not contain light source information, on the basis of spectral reflectance of the target color, and a color matching function; and generating a function which represents weights on errors for respective wavelengths, on the basis of the tristimulus values and the color matching function, and using the generated function as the first weighting data.

7. The method according to claim 1, wherein said second acquisition step includes steps of:

calculating wavelength characteristics of principal components of a plurality of orders and contribution ratios thereof by making principal component analysis of light source information of the light source; and generating a function, which represents weights on errors for respective wavelengths, on the basis of the wavelength characteristics and contribution ratios of the principal components, and using the generated function as the second weighting data.

8. The method according to claim 7, further comprising:

a light source selection step of selecting and setting the light source, wherein a plurality of light sources can be set as the light source.

9. The method according to claim 8, further comprising:

a measurement step of measuring a spectral distribution of an environmental illumination light source, and wherein said second acquisition step can use the spectral distribution measured in the measurement step as light source information of a light source.

10. The method according to claim 1, further comprising:

a step of measuring spectral distribution characteristics of the target and evaluation colors.

11. A color evaluation apparatus for evaluating precision of color matching of an evaluation color with respect to a target color, comprising:

a calculation unit adapted to calculate a difference between spectral distribution data of the evaluation color and spectral distribution data of the target color;

a first acquisition unit adapted to acquire first weighting data calculated from the spectral distribution data of the target color;

a second acquisition unit adapted to acquire second weighting data calculated from spectral distribution data of a light source; and an evaluation unit adapted to calculate an evaluation value used to evaluate the precision of color matching of the evaluation color with respect to the target color using the difference between the spectral distribution data, and the first and second weighting data, wherein said calculation unit includes a difference unit adapted to calculate differences between spectral reflectance characteristics of the evaluation and target values for respective wavelengths, and wherein said evaluation unit applies the first and second weighting data to the differences for respective wavelengths calculated in said difference unit, calculates a sum total of the differences, and uses the sum total as the evaluation value.

12. The apparatus according to claim 11, wherein the first weighting data is calculated in accordance with brightness characteristics of a human eye.

13. The apparatus according to claim 11, wherein the second weighting data is calculated from spectral distribution data of a plurality of different light sources.

14. The apparatus according to claim 11, wherein types of light sources to be adopted by said second acquisition unit can be manually selected.

15. The apparatus according to claim 11, wherein said first acquisition unit generates the first weighting data on the basis of wavelength characteristics of the target color, which are independent of a light source, and human visual characteristics, which depend on wavelengths.

16. The apparatus according to claim 15, wherein said first acquisition unit acquires tristimulus values, which do not contain light source information, on the basis of spectral reflectance of the target color, and a color matching function, and said first acquisition unit generates a function which represents weights on errors for respective wavelengths, on the basis of the tristimulus values and the color matching function, and uses the generated function as the first weighting data.

17. The apparatus according to claim 11, wherein said second acquisition unit calculates wavelength characteristics of principal components of a plurality of orders and contribution ratios thereof by making principal component analysis of light source information of the light source, and said second acquisition unit generates a function, which represents weights on errors for respective wavelengths, on the basis of the wavelength characteristics and contribution ratios of the principal components, and uses the generated function as the second weighting data.

18. The apparatus according to claim 17, further comprising:

a measurement unit adapted to measure a spectral distribution of an environmental illumination light source, wherein said second acquisition unit can use the spectral distribution measured by said measurement unit as light source information of a light source.

19. A computer readable memory which stores a control program for making a computer execute a color evaluation process for evaluating precision of color matching of an evaluation color with respect to a target color, the color evaluation process, comprising:

a calculation step of calculating a difference between spectral distribution data of the evaluation color and spectral distribution data of the target color;

a first acquisition step of acquiring first weighting data calculated from the spectral distribution data of the target color;

a second acquisition step of acquiring second weighting data calculated from spectral distribution data of a light source; and an evaluation step of calculating an evaluation value used to evaluate the precision of color matching of the evaluation color with respect to the target color using the difference between the spectral distribution data, and the first and second weighting data, wherein said calculation step includes a difference step of calculating differences between spectral reflectance characteristics of the evaluation and target values for respective wavelengths, and wherein said evaluation step includes a step of applying the first and second weighting data to the differences for respective wavelengths calculated in said difference step calculating a sum total of the differences, and using the sum total as the evaluation value.

* * * * *